US012221327B2

(12) United States Patent
Atherden

(10) Patent No.: US 12,221,327 B2
(45) Date of Patent: Feb. 11, 2025

(54) MOBILE CRANE OPERATION CONTROL

(71) Applicant: TEREX AUSTRALIA PTY LTD, Eagle Farm (AU)

(72) Inventor: Michael Atherden, Eagle Farm (AU)

(73) Assignee: TEREX AUSTRALIA PTY LTD, Eagle Farm (AU)

( * ) Notice: Subject to any disclaimer, the term of this patent is extended or adjusted under 35 U.S.C. 154(b) by 0 days.

(21) Appl. No.: 17/769,566

(22) PCT Filed: Oct. 16, 2020

(86) PCT No.: PCT/AU2020/051118
§ 371 (c)(1),
(2) Date: Apr. 15, 2022

(87) PCT Pub. No.: WO2021/072503
PCT Pub. Date: Apr. 22, 2021

(65) Prior Publication Data
US 2024/0124271 A1    Apr. 18, 2024

(30) Foreign Application Priority Data

Oct. 17, 2019 (AU) ................................ 2019903922

(51) Int. Cl.
*B66C 13/18* (2006.01)
*B60K 35/28* (2024.01)
(Continued)

(52) U.S. Cl.
CPC .............. *B66C 13/18* (2013.01); *B60K 35/28* (2024.01); *B60K 35/81* (2024.01); *B66C 13/46* (2013.01);
(Continued)

(58) Field of Classification Search
CPC ......... B66C 13/18; B66C 13/46; B66C 23/88; B66C 23/42; B66C 2700/084; B60K 35/81; B60K 35/28; B60K 2360/167
(Continued)

(56) References Cited

U.S. PATENT DOCUMENTS 5,711,440 A    1/1998  Wada
10,144,621 B2    12/2018  Braun et al.
(Continued)

FOREIGN PATENT DOCUMENTS

CN    102259799 A    11/2011
CN    101780926 B    5/2012
(Continued)

OTHER PUBLICATIONS

English Translation for CN-102259799-B. (Year: 2024).*
(Continued)

*Primary Examiner* — Mahmoud S Ismail
(74) *Attorney, Agent, or Firm* — Brooks Kushman, P.C.

(57) ABSTRACT

A method is provided for controlling an operation of a mobile crane, the operation comprising a user input, the user input comprising a command to change a configuration of the mobile crane. The method comprises the steps of: determining a current tipping moment of the mobile crane, the tipping moment comprising a moment about a tipping line of the mobile crane; predicting an effect of the user input on the tipping moment of the mobile crane; and if the predicted effect of the user input is to increase the tipping moment of the mobile crane past a predetermined amount, altering a response to the user input. A system for controlling an operation of a mobile crane, and a user display system for a mobile crane are also provided.

20 Claims, 6 Drawing Sheets

(51) Int. Cl.
  *B60K 35/81*  (2024.01)
  *B66C 13/46*  (2006.01)
  *B66C 23/88*  (2006.01)
  *B66C 23/42*  (2006.01)

(52) U.S. Cl.
  CPC ........ *B66C 23/88* (2013.01); *B60K 2360/167* (2024.01); *B66C 23/42* (2013.01); *B66C 2700/084* (2013.01)

(58) Field of Classification Search
  USPC .......................................................... 701/50
  See application file for complete search history.

(56) References Cited

U.S. PATENT DOCUMENTS

| | | | |
|---|---|---|---|
| 2016/0318739 A1 | 11/2016 | Terata et al. | |
| 2018/0057318 A1 | 3/2018 | Benton et al. | |
| 2019/0033158 A1* | 1/2019 | Bonnet | ................... E02F 9/264 |
| 2020/0071908 A1* | 3/2020 | Cherney | ............... B60W 10/20 |
| 2021/0347222 A1 | 11/2021 | McPherson | |
| 2022/0356050 A1 | 11/2022 | McPherson | |

FOREIGN PATENT DOCUMENTS

| | | | | |
|---|---|---|---|---|
| CN | 102464270 A | | 5/2012 | |
| CN | 102259799 B | * | 12/2012 | ............. B66C 13/22 |
| GB | 2 112 940 A | | 7/1983 | |
| WO | 2014138801 A1 | | 9/2014 | |
| WO | 2018049475 A1 | | 3/2018 | |

OTHER PUBLICATIONS

PCT International Search Report and Written Opinion, Dated Nov. 20, 2020, Application No. PCT/AU2020/051118, Applicant Terex Australia Pty Ltd, 11 Pages.
European Search Report for EP Application No. 20876644, dated Jul. 12, 2023, 3 pages.

* cited by examiner

MOBILE CRANE OPERATION CONTROL

CROSS-REFERENCE TO RELATED APPLICATIONS

This application is the U.S. national phase of PCT Application No. PCT/AU2020/051118 filed on Oct. 16, 2020, which claims priority to Australian Patent Application No. AU 2019903922 filed on Oct. 17, 2019, the disclosures of which are incorporated in their entireties by reference herein.

TECHNICAL FIELD

Embodiments relate to controlling the operation of a mobile crane, in particular, a pick and carry crane.

BACKGROUND

A pick and carry crane is a crane which is able to move (i.e. travel) while it has a load suspended from a boom of the crane. Some pick and carry cranes are able to drive on public roads at highway speeds where they are classified as special purpose vehicles. The design of pick and carry cranes can vary depending on the application of the crane. Some designs of pick and carry cranes are more manoeuvrable compared to other crane types. For example, when the pick and carry crane is articulated, the whole crane can fit within a turning circle of the crane. This design feature can enable articulated pick and carry cranes to be used in tight or confined spaces to lift and move loads, such as on the floor of a manufacturing facility.

Pick and carry cranes can also take the form of "taxi cranes", i.e. cranes travelling with all equipment required to operate the crane through the full range of capability of that crane. Many cranes cannot operate as a taxi crane since they cannot transport all components required to operate, hence support vehicles are generally required to carry extra components, such as counterweights and rigging including slings & hooks.

In general, in pick and carry cranes, the same operator station is used to control the crane when travelling (such as on a public road) as when operating the crane at a facility. This "single cabin" arrangement helps to simplify crane configuration, and provides flexibility for the operator (i.e. by not having to move back and forth between a driver's cab and a crane cab).

Such pick and carry cranes have tipping lines defined by the points of contact between the crane and the ground (i.e. the tyres). So, when the moment about the tipping line is sufficient, the crane will tip, or fall, about the tipping line. There are many factors which can affect the extent of the moment about the tipping line ("tipping moment") such as boom extension, boom luff, load weight and weight distribution, incline of the ground and orientation of the crane relative to that incline, extend of crane articulation, swing of the load, etc.

Since pick and carry cranes are generally dimensioned to fit public roads, tipping can be a significant concern. Not only does tipping of the crane damage the crane, but also poses a significant safety concern to the operator of the tipped crane as well as any personnel in the vicinity who may be placed at risk by a tipping crane.

With other mobile cranes outriggers can be used to minimise susceptibility to sideways tipping. However, such outriggers are used when the crane is operating at a stationary position. Since pick and carry cranes need to travel with a load, this means that outriggers typically cannot be used.

It is to be understood that references herein to the prior art do not constitute an admission that such art forms a part of the common general knowledge of a person of ordinary skill in the art, in Australia or any other country.

SUMMARY

Embodiments relate to a method of controlling an operation of a mobile crane, the operation comprising a user input, the user input comprising a command to change a configuration of the mobile crane, the method comprising the steps of:

determining a current or future tipping moment of the mobile crane, the tipping moment comprising a moment about a tipping line of the mobile crane;

predicting an effect of the user input on the tipping moment of the mobile crane; and if the predicted effect of the user input is to increase the tipping moment of the mobile crane past a predetermined amount, altering a response to the user input.

The current or future tipping moment of the mobile crane may be determined with reference to a current or future configuration of the mobile crane.

The predetermined amount may be evaluated with respect to one or more of: one or more tipping lines of the mobile crane; a distance between a centre of gravity of the crane and the one or more tipping lines; and a load being carried by the mobile crane.

The response to the user input may be altered if a rate of change of the configuration of the crane exceeds a predetermined rate.

The configuration of the mobile crane may comprise a location of a centre of gravity of the crane relative to one or more tipping lines of the mobile crane.

The user input may correspond to a function of the mobile crane, the function having a function speed and wherein the altered response to the user input may comprise reducing the function speed.

The function of the user input may correspond to a change of one or more of the following:

a speed of the mobile crane;
a luff angle of a boom of the mobile crane;
an extension of the boom;
an articulation of a front chassis of the mobile crane relative to a back chassis of the mobile crane;
an activation of a winch of the mobile crane;
a lateral articulation angle of the boom of the mobile crane;
a pitch of a chassis of the mobile crane; and
a roll of a chassis of the mobile crane.

The method may further comprise determining one or more of: a position, a velocity and an acceleration of the load or the boom head and altering a response to the user input based on this determination.

The method may further comprise determining an acceleration of the boom head and altering a response to the user input based on this determination.

The method may further comprise further altering a response to the user input if the predicted effect of the user input is to increase the tipping moment of the mobile crane past a further predetermined amount.

The user input comprising the command to change a configuration of the mobile crane may be a command to change the configuration of the mobile crane by a change amount. The step of altering a response to the user input may be to vary the change amount so that the tipping moment of the mobile crane is maintained within the predetermined amount after the configuration has changed.

The change amount may be varied in dependence on a difference between the determined tipping moment and the predetermined amount. The change amount may be reduced. The change amount may be small or zero for a large difference and may be large for a large difference.

The method may further comprise predicting characteristics of terrain which the mobile crane may traverse wherein the user input comprises acceleration or deceleration and wherein altering a response to the user input comprises reducing, increasing or preventing the acceleration or deceleration.

A further embodiment extends to a user display system for a mobile crane, the user display system comprising a user display and a configuration determinator, the user display comprising at least one display element, the display element corresponding to a mobile crane characteristic affected by user inputs, each display element comprising a first portion designating a safe zone of the corresponding characteristic and a second portion designating a warning zone of the corresponding characteristic, wherein the configuration determinator determines a current or future tipping moment of the mobile crane, the tipping moment comprising a moment about a tipping line of the mobile crane;

predicting an effect of the user input on the tipping moment of the mobile crane; and if the predicted effect of the user input is to increase the tipping moment of the mobile crane past a predetermined amount:

designating a first range of the effect of the user input as a safe range and a second range of the effect of the user input as a warning range;

displaying the first portion and the second portion in dependence on a relation between the first range of the effect relative and the second range of the effect.

The user display may include a representation of the mobile crane. The display element may be a portion of the representation of the mobile crane and may represent of a range of configurations, the range of configurations corresponding to changes from the user input. The first and second portions may be displayed as overlays on the representation of the crane. The overlay may correspond to the characteristic affected by the user input. For example, where the user input concerned affects the boom articulation, the first and second portions may be overlayed over a representation of the range of possible boom articulation.

The system may further comprise updating the display in response to a change in a configuration of the crane. The change in the configuration may be as a result of user input or a change in orientation or load of the mobile crane.

The predetermined amount may be evaluated with respect to one or more of: one or more tipping lines of the mobile crane; a distance between a centre of gravity of the crane and the one or more tipping lines; and a load being carried by the mobile crane.

The mobile crane characteristic may correspond to one or more of the following:
a speed of the mobile crane;
a luff angle of a boom of the mobile crane;
an extension of the boom;
an articulation of a front chassis of the mobile crane relative to a back chassis of the mobile crane;
an activation of a winch of the mobile crane; and
a lateral articulation angle of the boom of the mobile crane.

The user display may comprise a plurality of display elements, each display element corresponding to a different mobile crane characteristic.

At least one display element may comprise a rectangle wherein the first and second portions are corresponding first and second portions of the rectangle.

A relative size of the first portion of the rectangle to the second portion of the rectangle may be related to a size of the first range compared to a size of the second range.

The display element may comprise a first dimension and a second dimension wherein the first dimension corresponds to a first user input and the second dimension corresponds to a second user input. In such an embodiment, the display element will be divided into a plurality of display portions, each portion being designated as a safe type or as a warning type. In an embodiment, there are plurality of types, each having a severity rating. The display may depend on the severity rating. The colour of the portion may be related to the severity rating.

The mobile crane characteristic may correspond to one or more of the following:
a pitch of a chassis of the mobile crane; and
a roll of a chassis of the mobile crane.

The user display may comprise a terrain display adapted to display terrain the mobile crane may traverse, wherein the displayed terrain is divided into at least two portions wherein a first portion corresponds to a safe range of the pitch and/or the roll and a second portion corresponds to a warning range of the pitch and/or the roll, and wherein the determinator is adapted to display the first portion in a first colour and the second portion in a second colour. First colour may be green and the second colour may be orange.

May also designate a third portion of the display element corresponding to a danger zone. The first portion may be displayed in green. The second portion may be displayed in orange. The third portion may be displayed in red.

The system may further comprise updating the display in response to a change in a configuration of the crane. The change in the configuration may be as a result of user input or a change in orientation or load of the mobile crane.

A further embodiment extends to a method of updating a user display system for a mobile crane, the user display system comprising a user display and a configuration determinator, the user display comprising at least one display element, the display element corresponding to one or more mobile crane characteristic affected by user inputs, each display element comprising a first portion designating a safe zone of the corresponding characteristic and a second portion designating a warning zone of the corresponding characteristic, the method comprising determining a current or future tipping moment of the mobile crane, the tipping moment comprising a moment about a tipping line of the mobile crane;

predicting an effect of the user input on the tipping moment of the mobile crane; and if the predicted effect of the user input is to increase the tipping moment of the mobile crane past a predetermined amount:

designating a first range of the effect of the user input as a safe range and a second range of the effect of the user input as a warning range;

displaying the first portion and the second portion in dependence on a relation between the first range of the effect relative and the second range of the effect.

A further embodiment extends to a system for controlling an operation of a mobile crane, the system comprising a user operable control, the user operable control generating a user input comprising a command to actuate an actuator for changing a configuration of the mobile crane, the system further comprising a determinator adapted to:
    determine a current tipping moment of the mobile crane, the tipping moment comprising a moment about a tipping line of the mobile crane;
    predict an effect of the user input on the tipping moment of the mobile crane; and
    if the predicted effect of the user input is to increase the tipping moment of the mobile crane past a predetermined amount, altering a response to the command of the user input.

The predetermined amount may be evaluated with respect to one or more of: one or more tipping lines of the mobile crane; a distance between a centre of gravity of the crane and the one or more tipping lines; and a load being carried by the mobile crane.

The response to the command of the user input may be further altered if a rate of change of the configuration of the crane exceeds a predetermined rate.

The configuration of the mobile crane may comprise a location of a centre of gravity of the crane relative to one or more tipping lines of the mobile crane.

The actuator actuated by the user input may correspond to a function of the mobile crane, the function having a function speed and wherein the altered response to the command of the user input comprises reducing the function speed.

The function of the user input may correspond to one or more of the following:
    a speed of the mobile crane;
    a luff angle of a boom of the mobile crane;
    an extension of the boom;
    an articulation of a front chassis of the mobile crane relative to a back chassis of the mobile crane;
    an activation of a winch of the mobile crane;
    a lateral articulation angle of the boom of the mobile crane;
    a pitch of a chassis of the mobile crane; and
    a roll of a chassis of the mobile crane.

The system may further comprise one or more sensors for determining one or more of: a position, a velocity and an acceleration of the load or the boom head and wherein the determinator alters a response to the command of the user input based on this determination.

The system may further comprise determining an acceleration of the boom head and altering a response to the user input based on this determination.

The determinator may be adapted to further alter a response to the command of the user input if the predicted effect of the user input is to increase the tipping moment of the mobile crane past a further predetermined amount.

The system may further comprise predicting characteristics of terrain which the mobile crane may traverse wherein the user input comprises acceleration or deceleration and wherein altering a response to the user input comprises reducing, increasing or preventing the acceleration or deceleration.

The mobile crane may be a pick and carry crane. The mobile crane may be a taxi crane. The mobile crane may exclude outriggers.

BRIEF DESCRIPTION OF THE DRAWINGS

Embodiments are herein described, with reference to the accompanying drawings in which.

DETAILED DESCRIPTION

Figure 1:
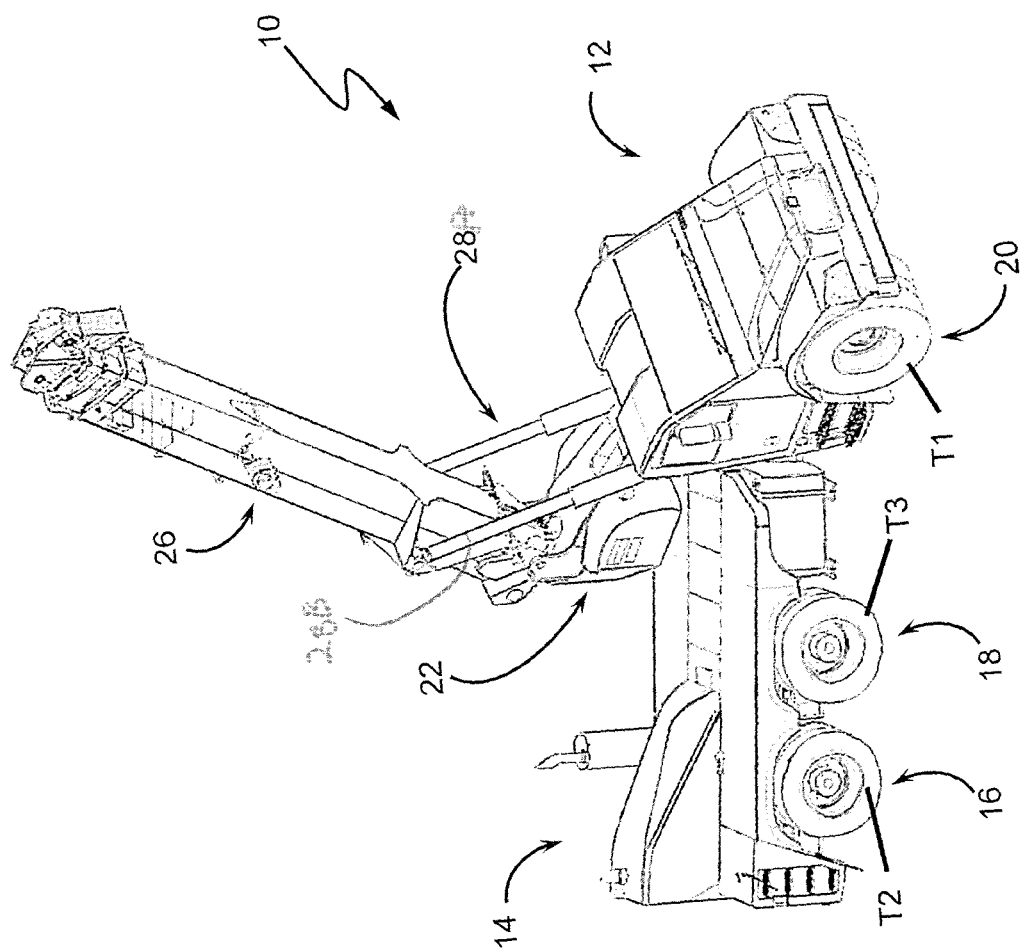
FIG. 1 shows a perspective view of an embodiment of a pick and carry crane.
Figure 2:
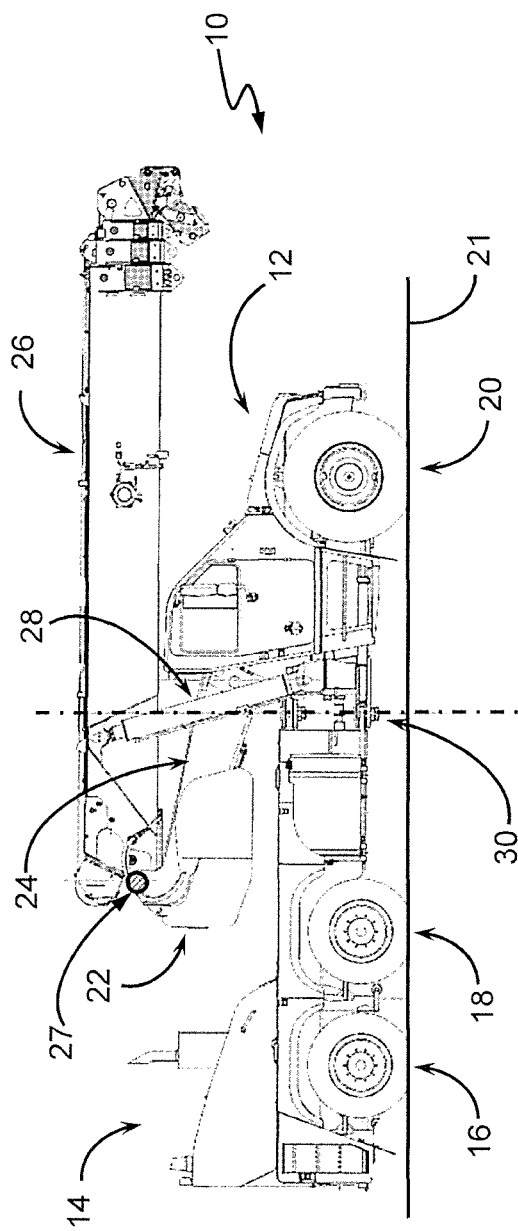
FIG. 2 shows a side view of the pick and carry crane.
Figure 3:
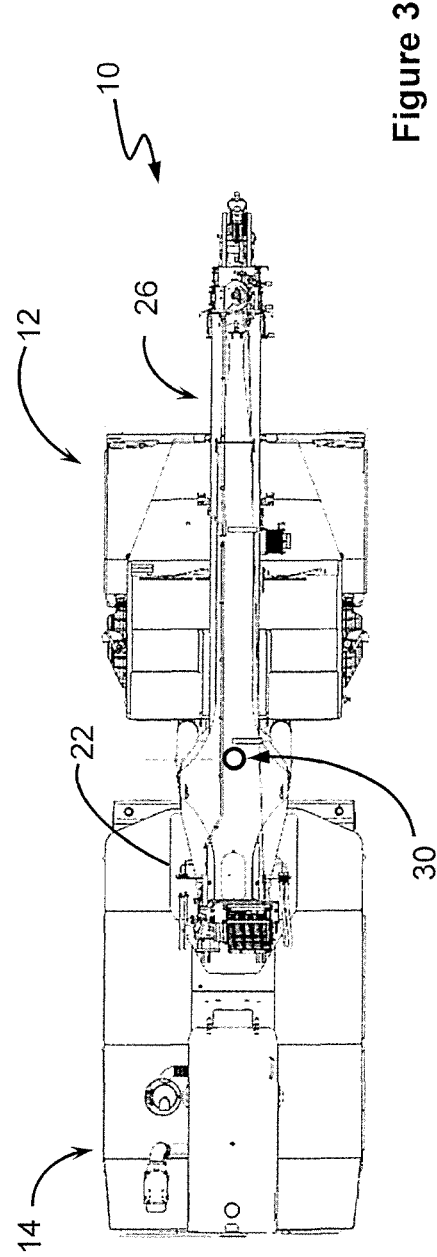
FIGS. 3 and 4 show plan views of the pick and carry crane.

FIGS. 1, 2 and 3 show a pick and carry crane 10. The crane 10 has a front body 12 which is the front part of the crane 10. The front body 12 is pivotally connected via a pivot arrangement 30 (exemplified by the dashed line in FIGS. 2 and 3) to a rear body 14 of the crane 10. The pivot point 30 is provided with moveable linkages (hydraulic rams in this instance although other linkages are known), to control the pivot angle of the front body 12 to the rear body 14. Adjusting the pivot angle using the moveable linkages helps to turn the crane 10.

Figure 4:
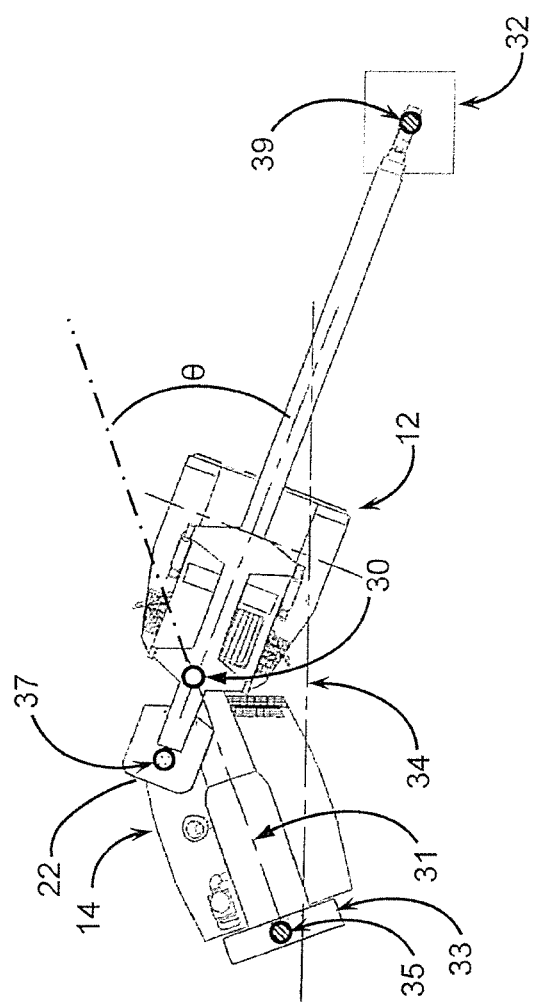

A side tipping line 34 (see FIG. 4) is defined when the front body 12 is pivoted relative to the rear body 14.

In the embodiment of the pick and carry crane 10 as depicted in the Figures, the side tipping line 34 is an imaginary longitudinal axis that extends between a point at which the outer tyres T1 of the front body contact the ground, via wheel 20, and a point at which the outer tyre T3 of the rear body contacts the ground, via wheel 18. Thus, the tyres T1 and T3 of the wheels 20 and 18 define the points about which the crane may topple sideways. The crane 10 includes two sets of rear tyres T3 and T2. In this embodiment, the foremost set T3 is used to define the tipping line as the rearmost set T2 can be lifted during a taxi mode so that those tyres are no longer in contact with the road or other travel surface.

The pick and carry crane illustrated has three axles, but is to be realised that in different embodiments, the mobile crane may have two axles, or more than three axles.

Attached to the rear end of the front body 12 is a boom support arm 24. The boom support 24 may be a separate structure that is mounted e.g. welded or bolted to the front body 12. In an embodiment, the boom support arm 24 forms part of the chassis of the front body 12. The boom support arm 24 pivotally supports boom 26, where the boom 26 is raised and lowered about the pivot point, represented by pin 27 (FIG. 2), using linear actuators in the form of hydraulic rams 28A and 28B, between the front body 12 and the boom 26. The boom 26 is telescopic. Other forms of linear actuators and booms can be used in place of or in addition to rams 28 and boom 26.

Figure 5:
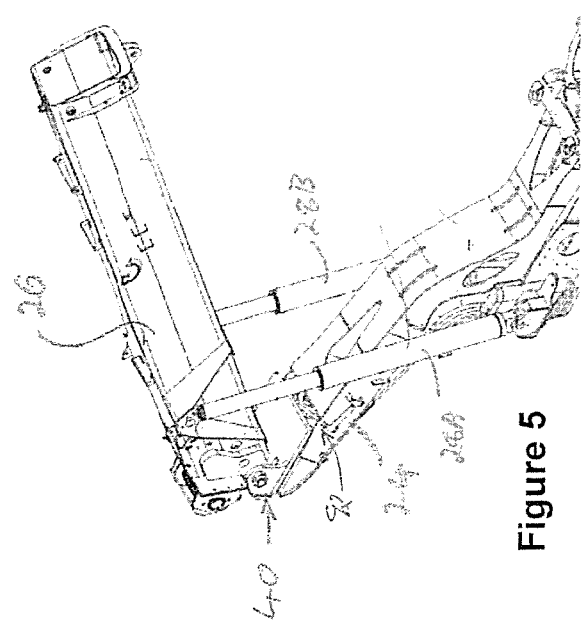
FIG. 5 illustrates a detail of the boom attachment.

FIG. 5 illustrates the joins between the boom 26 and the boom support arm 24. Embodiments employ boom articulation which allows both up and down articulation as well as side to side articulation of the boom. In the embodiment illustrated in FIG. 5, a dual articulation joint 40 provides both forms of articulation.

In this embodiment, the lateral movement of the boom 26 is restricted to 5° either side of the vertical so that the total lateral movement of the boom is restricted to 10°.

In an alternate embodiment, the total lateral movement of the boom is restricted to 20°, 10° to either side of the vertical.

Figure 6:
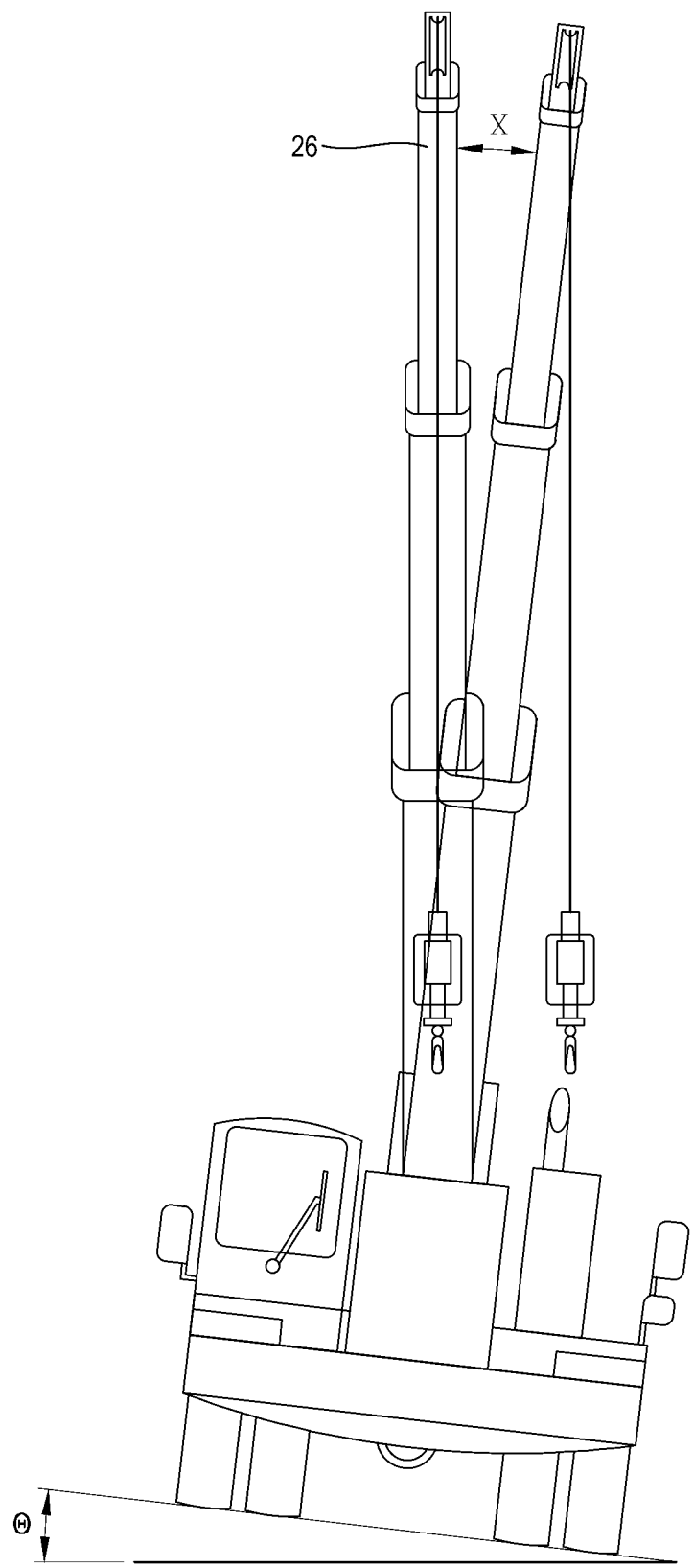
FIG. 6 illustrates lateral articulation of the boom of the pick and carry crane.

FIG. 6 illustrates the lateral articulation of the boom 26 at an angle α. As shown the pick and carry crane 12 is here depicted on slanted terrain 'G' at an angle θ relative to the horizon. The slope of the terrain 'G' will move the centre of gravity away from the centre of the pick and carry crane, thereby increasing the tipping moment, destabilising the crane. By laterally articulating the boom 26 as illustrated, the centre of gravity is brought back towards the centre of the crane, thereby reducing the tipping moment and potentially improving the stability.

In alternate embodiments, the extent of the lateral movement may be set depending on a number of factors such as the maximum length of the boom when extended, the capacity of the crane, operating conditions etc.

The hydraulic rams 28A and 28B control both the up and down articulation of the boom 26 as well as the lateral articulation. For certain embodiments there may be an advantage to using hydraulic rams to control both up and down, and lateral articulation since known pick and carry cranes include such hydraulic rams. Therefore, it is not necessary to develop and install a new articulation mechanism to accommodate the lateral articulation in addition to the existing up and down articulation.

Features of pick and carry cranes relating to the control of tipping are described in PCT/AU2014/000261, PCT/AU2017/050999, AU2018903904 and AU2019903890, the contents of which are incorporated herein. It is to be realised that the lateral articulation of the boom as herein described could be incorporated in the tipping prevention considerations and controls discussed in those applications.

Figure 7:
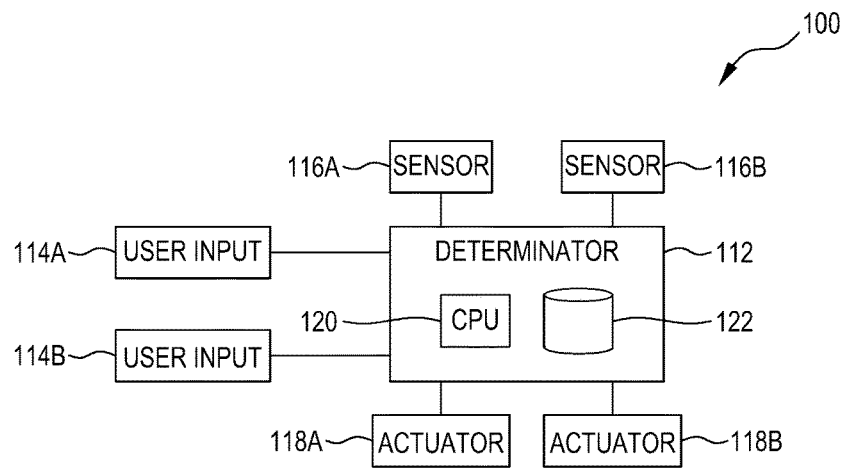
FIG. 7 is a schematic illustration of a layout of components of the pick and carry crane.

FIG. 7 illustrates a system 100 for controlling an operation of the mobile crane 10. The system comprises two user controls 114A and 114B connected to a determinator 112. Two actuators 118A and 118B are also connected to the determinator 112 as are two sensors 116A and 116B. In use a user will actuate one of the user controls 114A or 114B which sends a command to the determinator 112. The determinator 112 will process that command in the manner described below, and if appropriate actuate the corresponding actuator.

In the embodiment illustrated, each user control 114A and 114B corresponds to an actuator so user control 114A may actuate actuator 118A and user control 114B may actuate actuator 118B.

The determinator 112 receives input from the sensors 116A and 116B and uses this input in the manner described below.

FIG. 7 is schematic in nature. The user controls may correspond to the control of any one of the following functions of the mobile crane 10:

a speed of the mobile crane;
a luff angle of the boom 26 of the mobile crane;
an extension of the boom 26;
an articulation of the front chassis or body 10 of the mobile crane relative to a back chassis or body 14 of the mobile crane;
an activation of a winch of the mobile crane; or
a lateral articulation angle of the boom 26 of the mobile crane.

The mobile crane is driven by altering the speed and the steering which corresponds to an articulation of the front chassis relative to the rear chassis. As the mobile crane traverses different terrain, the pitch and roll of the front and rear chassis may be affected and therefore, the pitch and roll of the front and rear chassis are further characteristics of the mobile crane which may be affected by user input.

Therefore, the user controls 114A and 114B correspond, for example to a luff up/down lever, or a boom extend/retract lever. The manner in which each of the above functions (characteristics) of the crane is controlled is known in the art and will not be further described herein. For the current description it is sufficient to note that each user control will actuate a corresponding actuator 118A and 118B. Each command issued by a user control will generally have a direction and a magnitude associated with it.

So, if a user control corresponds to luff up/luff down, then the corresponding actuator will be the hydraulic rams 28A and 28B.

The determinator 112 comprises a central processing unit 120 connected to storage 122. When a command is received by the determinator 112 from a user control 114A, the determinator will initially evaluate the current tipping moment of the crane. In this embodiment, the tipping moment is evaluated by determining the position of the centre of gravity of the crane relative to the tipping line 34. It is to be realised that there are three other tipping lines which may be relevant, with reference to FIG. 4 the four lines joining the outer tyres in contact with the travel surface. In practice it is only the side tipping lines which are relevant since the mobile crane is exceedingly unlikely to tip over forwards or backwards due to the weight distribution.

Therefore, in this embodiment, the tipping moment is calculated by first determining the distance between the centre of gravity to the closest side tipping line. However, in further embodiments, the calculation may be repeated for the forward and backward tipping lines.

The position of the centre of gravity may not always be known precisely. In an embodiment, the tipping moment is estimated by determining the position of the top of the boom based on sensor or usage data and assuming that the load is located directly below the attachment point to the boom. The vertical position of the load relative to the attachment point may be estimated based on sensor or usage data for the winch. In an embodiment, the centre of gravity is determined based on the weight of the load, the angle and extension of the boom, and the vertical height of the load.

In this embodiment, the tipping moment is calculated as:
Distance from load to tipping line * weight of the suspended load It is to be realised that, for best results, both vertical and lateral distances between the tipping line and the load are taken into account.

The determinator 112 will then compare the determined tipping moment to a predetermined amount. In this embodiment, since an approximation is used the predetermined amount is set as 90% of the rated capacity of the crane. This will provide sufficient leeway to account for most errors.

The determinator will then predict an effect of the user input on the tipping moment of the mobile crane. To do this, the determinator 112 will effectively run a simulation whereby it assumes that the command corresponding to the user input is carried out and determines the effect of this on the tipping moment. To do so, the determinator stores a mathematical model of the mobile crane including the position of the load, determines how the command would change the configuration of the crane including the position of the load, articulation of the crane and, if applicable, the pitch and roll of the front and read chassis, and then recalculates the tipping moment in the manner described above.

If the determinator then determines that the user's command will result in the tipping moment exceeding the predetermined amount (90% of the rated capacity), the determinator will alter a response to the user input. It is to be realised that the manner in which the response to the user input is altered will depend on the user input. However, in certain embodiments, where the command issued by a user control has a direction and a magnitude associated with it, the determinator will alter either or both of the direction and the magnitude.

For example, if the operator actuates the luff up/down lever to execute a command to raise the boom by 20° and the determinator determines that this command would cause the tipping moment to exceed the predetermined amount, then the command may be restricted to 4°. Alternatively, the determinator will determine the maximum allowable and substitute that instead.

In a further example, the operator actuates the luff up/down control, but this control is restricted to controlling a speed of the boom luff and has 10 different speeds and a direction (up or down). In this case, the determinator may predict the effect of the command over a predetermined time (e.g. 30s) and evaluate the change to the tipping moment of the crane over that predetermined time and, if the tipping moment exceeds the predetermined amount then restrict the speed of the change in the boom luff, for example.

In further example, the time period used by the determinator will depend on the evaluation of the current tipping moment. If it is determined that the current tipping moment is close to the predetermined amount, then the time period over which the effect of the command is predicted will be shorter than if the current tipping moment is further away from the predetermined amount.

In a further embodiment, the determinator evaluates the rate of change of the tipping moment. This may be a more accurate determination of whether the crane is in imminent danger of tipping since, particularly with variables such as a change in the roll of the chasses, the tipping moment can be affected exponentially if the boom is extended and has a relatively large luff angle.

In an embodiment, the velocity of the boom head is determined and used as an approximation of the rate of change of the tipping moment. If the velocity of the boom head compared to the current tipping moment In the determination of the tipping moment as described, it is necessary to know the position of the load. In an embodiment, it is assumed that the load is positioned vertically below the attachment point to the boom, and the attachment point of the boom is calculated using sensors which determine the angle and extension of the boom, height of the load, and the articulation of the crane. In an alternate embodiment, usage data is used to determine the current configuration of the crane (angle and extension of the crane).

In a further embodiment, the crane includes sensors which determine the position, velocity and acceleration of the load, and these measurements are used to determine the tipping momentum. An advantage of such an embodiment may be that any swing in the load can be determined and combined with the determination of the tipping moment. Since a small variation of the configuration of the crane can result in large changes to the swing in the load, particularly when the articulation and boom orientation are away from the resting position (no articulation, boom down and fully retracted).

In these circumstances, determination of the swing of the load may be used to restrict the response to a user command when the load is in a position which tends to increase the tipping moment. In an embodiment, the manner in which the command is executed may reduce the load swing, in particular when the command relates to lateral articulation of the boom.

It is to be realised that in further embodiments, refinements are possible. For example the determinator may alter a response to the user input in dependence on a difference between the determined tipping moment and the predetermined amount. So, if that difference is large, the command corresponding to the user input is not restricted, but as the difference gets smaller, the restriction increases until, when the predetermined amount has been reached, the user input is blocked entirely.

In certain embodiments, the future tipping moment may be calculated. If, for example, it is known that the configuration may change in future, those changes may be taken into account when calculating the tipping moment. For example, if it is known that the configuration of the crane will change due to characteristics of the terrain that the crane will transverse, these may be taken into account when calculating the tipping moment.

Figure 8:
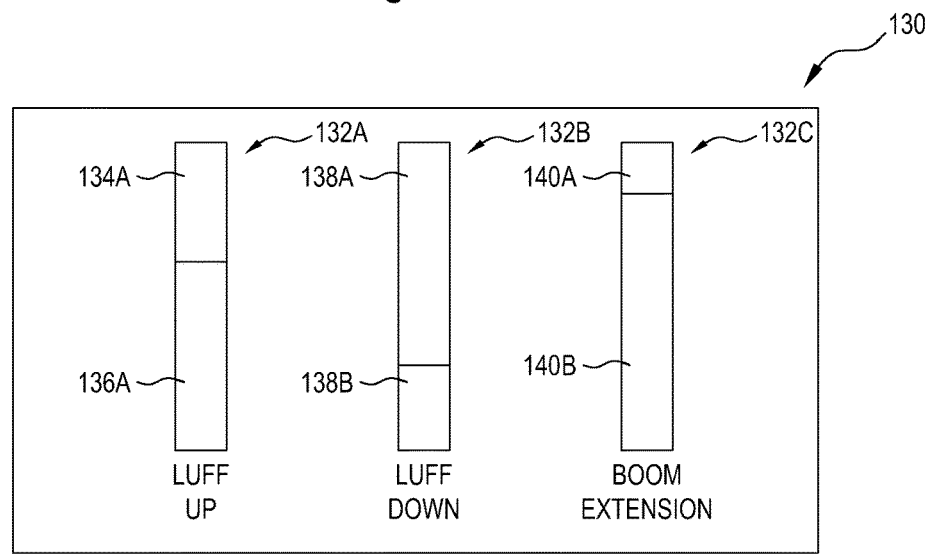
FIGS. 8 to 11 illustrate aspects of user displays of the pick and carry crane.

FIG. 8 illustrates a user display 130 connected to the determinator 100. In this embodiment, the user display 130 comprises three display elements 132A, 132B and 132C. Each display element corresponds to a different command initiated by a user input. So, in this embodiment, display element 132A corresponds to luff up; display element 132B corresponds to luff down and display element 132C corresponds to boom extend.

As the user initiates the user input, the determinator determines a current tipping moment of the mobile crane and predicts an effect of the user input on the tipping moment of the mobile crane; and if the predicted effect of the user input is to increase the tipping moment of the mobile crane past a predetermined amount. This is done in the manner described above. The determinator will then designate a first range of the effect of the user input as a safe range and a second range of the effect of the user input as a warning range. For example, for the first range, the designator may determine that a tipping moment within 75% of the predetermined amount is safe and a tipping moment between 75% and 100% of the predetermined amount is a warning zone.

It is to be realised therefore that the predetermined amount corresponds to a tipping condition for the mobile crane (in other words a set of configurations of the crane where there is a high likelihood that the crane will tip, taking such variables into account such as the swing on the load and uneven distribution of the load).

The determinator will then divide up the corresponding display element into two portions and display the available range of the corresponding command as corresponding display portions which are represented in dependence on a relation between the range corresponding to the safe zone and the range corresponding to the warning zone.

For example, if the user initiates a luff up command, then the determinator will determine the amount of luff up which can be safe executed and an amount which will bring the crane close to tipping. If, for example, it determines that the safe zone is 5° from the current position and the warning zone is a further 15° beyond that, the display element 132A will be divided into two portions: 134A and 136A showing the operator the relative safe zone remaining in that aspect of the operation of the mobile crane.

This may provide the operator with a quick and intuitive representation of the available safe operation of the crane.

In this embodiment, the portion 136A corresponding to the warning zone is displayed in red, and the portion 134A corresponding to the safe zone is displayed in green. This may make it more intuitive for an operator to evaluate.

In this embodiment, the display is continuously updated as the configuration of the crane changes. If the user's operation tends to increase the tipping moment, the user will see the corresponding warning portions of the display increasing. Furthermore, as the configuration of the crane changes over time, the user will see corresponding changes to the warning portions of the display.

When a plurality of user inputs is represented on the screen, as shown in FIG. 8 (only three examples are shown; it is to be realised that many more may be shown), the user is provided with a representation which may be quickly evaluated.

This aspect may be usefully combined with the previous aspect of altering a response to a user input. In an embodiment, the user may experience reduced responsiveness to a command as the red regions on the display grow in size.

In a further embodiment, the display elements may be broken into three regions, and the determinator calculates a safe zone, a warning zone and a no-go zone. In this embodiment, the portion corresponding to the safe zone may be represented in green, the portion corresponding to the warning zone represented in orange and the portion corresponding the no-go zone represented in red.

Figure 9:
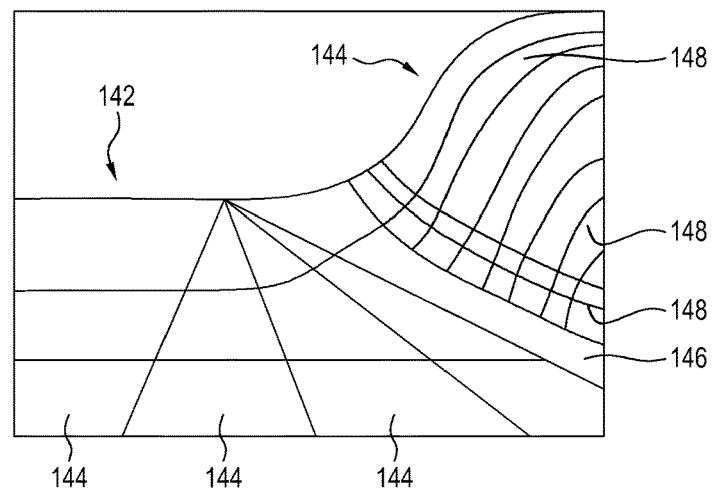

FIG. 9 illustrates a display 160 according to a further embodiment. The display 160 represents the terrain over which the crane may move. This may be derived from mapping data, from radar, or elsewhere. In the embodiment illustrated, the ground has a flat portion 142 and an inclined portion 144. Using range and altitude information, the determinator divides the terrain into regions which do not affect the tipping moment (regions 144) and regions which do affect the tipping moment, but which are acceptable in the current configuration (regions 146) and regions which would cause the crane to tip in the current configuration (regions 148).

The determinator classifies the terrain regions by determining the effect of the incline on the pitch and roll of the front and back chassis, calculating the tipping moment for those values (assuming that the remaining configuration stays the same) and comparing those against the predetermined value (here also 90% of the rated capacity).

In an embodiment, the effect of the user input may be varied depending on how close the crane configuration is to tipping, or how fast the tipping moment is approaching a tipping condition. It is to be realised that this may be done with any user input, but finds particular application to those user inputs where the user is able to determine a rate of change as well as a direction of change. With reference to the terrain depiction of FIG. 9, one set of examples where the effect of the user input may be reduced relates to control of the speed and direction of the crane.

If the user, for example, selects that the mobile crane should undergo maximum forward acceleration (by placing their foot flat on the accelerator pedal), and the determinator determines that there is a close undulation in the terrain, which if the mobile crane were to traverse, would result in a tipping condition, then the determinator would not provide the full acceleration to the user, but would, for example, only provide half of the available acceleration.

Similar considerations might apply to steering and other changes to the configuration of the mobile crane.

It is to be realised that the amount by which the effect of the user input is throttled may depend on the current configuration of the mobile crane. The closer the current configuration is to a tipping state, the more the effect will be throttled.

Figure 10:
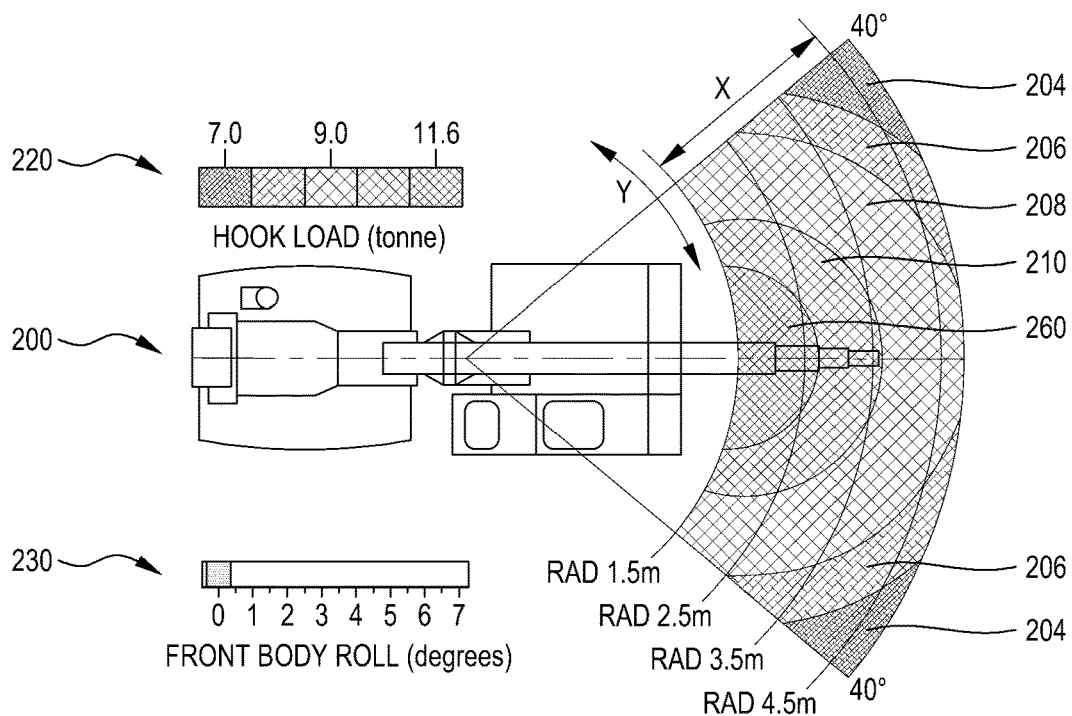

FIG. 10 illustrates a display 200 according to a further embodiment. The display 200 includes a representation of the mobile crane. In this embodiment, the display comprises a display element 202 which shows the safe zones for boom extension and luff (collectively forming the radius of the load relative to the body of the crane), and crane articulation. The display element 202 has two dimensions 'x' and 'y' where the x-dimension corresponds to the radius formed by boom extension and luff and the y-dimension corresponds to articulation. As shown, the element 202 is divided into display portions 202, 204, 206, 208 and 210 of decreasing danger of crane configuration. Marker 250 shows the current position of the end of the boom and therefore represents the current configuration of the mobile crane.

The display element 202 is generated by the determinator which calculates how changes to the current configuration would affect the tipping moment of the crane. The display element 202 is broken down into a series of pixels (which may, or may not correspond to the display pixels on the display concerned), each pixel representing a radius and length of the boom. In this embodiment, each pixel represents a 0.1 m change in the radius and 5° change in the articulation, but in further embodiments a coarser or finer resolution may be used.

For each of these pixels, a tipping moment for the crane is calculated and categorised according to how likely the crane is to tip in that configuration. To convey the tipping likelihood to the user, each pixel is assigned a colour according to the corresponding likelihood. In the embodiment illustrated, red is chosen for those configurations which would almost certainly lead to tipping; pink for those less likely to lead to tipping; light green for configurations almost certainly safe; and dark green for those configurations which are safe.

If the crane is in the corresponding configuration then increasing either the articulation or the boom extension will tend to move the crane towards tipping over, as reflected in the severity rating of that portion. A key 220 shows the severity rating, in this case designated by a corresponding colour. In the drawing shown the key 220 is labelled "Hook Load (tonne)". However, in this embodiment, the load weight has been determined and incorporated into the calculations of the pixel colours for the display element 202. Therefore, a more correct labelling for the key 202 would be "Percentage Rated Capacity" as this is intended to show the relative amount of rated capacity available to the operator.

It is to be realised that, in this embodiment, the determinator predicts the effect that boom extension and luff, and articulation would have on the tipping moment. For the purposes of determining the pixel colours, an assumption is made that the roll and pitch of the crane will remain constant.

However, as the roll and pitch of the crane change, the display element 202 will be updated.

Figure 11:
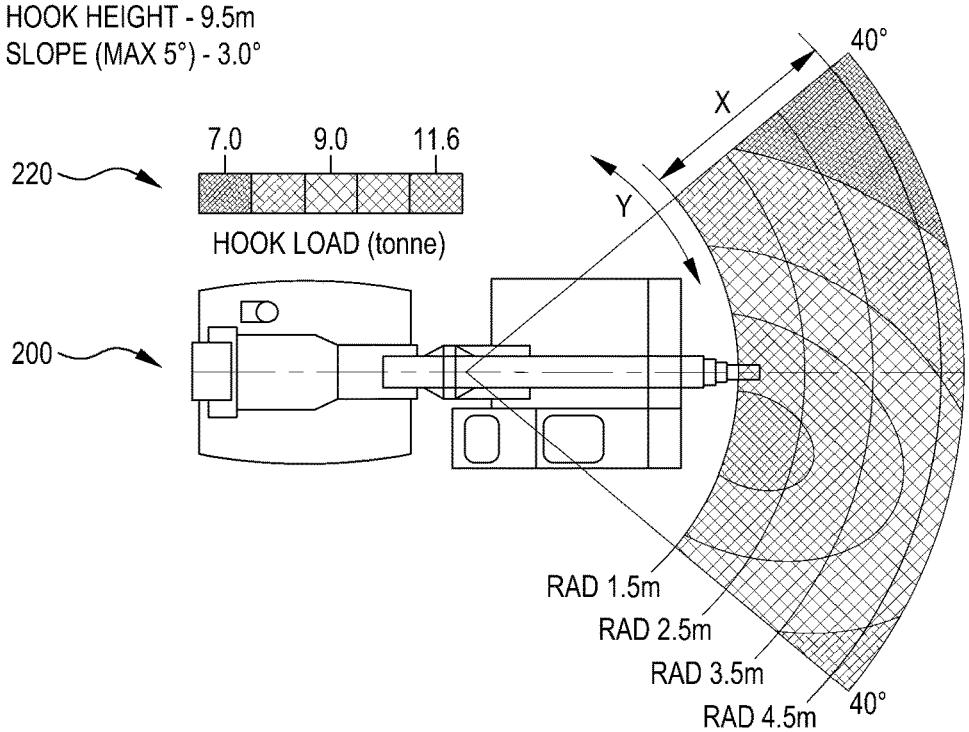

FIG. 11 illustrates a display 300 with a display portion 302 similar to the display portion 202 of FIG. 10, but for a different model of crane. The display element 302 differs from the display element 202 in that the different colour regions are not symmetrically arranged around the boom. This is because in this configuration, the crane is situated on uneven terrain (a 3° slope, as shown in the display 300) so that the tipping moment is unsymmetrical with respect to the boom.

In general, the display 200 or 300 will update as the pitch and roll of the crane changes over time, to reflect to the user how changes in the configuration can affect the tipping moment.

The invention claimed is:

1. A method of controlling an operation of a mobile crane, the operation comprising a user input, the user input comprising a command to change a configuration of the mobile crane, the method comprising steps of:

determining a current tipping moment of the mobile crane, the current tipping moment comprising a moment about a tipping line of the mobile crane;

predicting an effect of the user input on the current tipping moment of the mobile crane; and when the predicted effect of the user input is to increase the current tipping moment of the mobile crane past a predetermined amount, altering a response to the user input;

designating a first range of the eff ct of the user input as a safe ad a second range of the effect of the user input as a warning range; and causing a user display, wherein the user display comprises at least one display element corresponding to one or more mobile crane characteristics affected by user inputs. each display element comprising a first portion designating a safe zone of the corresponding one or more mobile crane characteristics and a second portion designating a warning zone of the corresponding one or more mobile crane characteristics, to display the first portion and the second portion in dependence on a relation between the first range of the effect relative and the second range of the effect.

2. The method according to claim 1 wherein the predetermined amount is evaluated with respect to one or more of: one or more tipping lines of the mobile crane;

a distance between a centre of gravity of the mobile crane and the one or more tipping lines; and a load being carried by the mobile crane.

3. The method according to claim 2 wherein the response to the user input is further altered if a rate of change of the configuration of the mobile crane exceeds a predetermined rate.

4. The method according to claim 1 wherein the configuration of the mobile crane comprises a location of a centre of gravity of the mobile crane relative to one or more tipping lines of the mobile crane.

5. The method according to claim 1 wherein the user input corresponds to a function of the mobile crane, the function having a function speed and wherein the altered response to the user input comprises reducing the function speed.

6. The method according to claim 5 wherein the function corresponds to a change of one or more of the following:
   a speed of the mobile crane;
   a luff angle of a boom of the mobile crane;
   an extension of the boom;
   an articulation of a front chassis of the mobile crane relative to a back chassis of the mobile crane;
   an activation of a winch of the mobile crane;
   a lateral articulation angle of the boom of the mobile crane;
   a pitch of a chassis of the mobile crane; and
   a roll of a chassis of the mobile crane.

7. The method according to claim 1 further comprising determining one or more of: a position, a velocity and an acceleration of a load or a boom head and altering a response to the user input based on this determination.

8. The method according to claim 7 further comprising determining an acceleration of the boom head and altering a response to the user input based on this determination.

9. The method according to claim 1 further comprising further altering the response to the user input if the predicted effect of the user input is to increase the tipping moment of the mobile crane past a further predetermined amount.

10. The method according to claim 1 wherein the user input comprising the command to change a configuration of the mobile crane is a command to change the configuration of the mobile crane by a change amount and wherein the step of altering a response to the user input comprises varying the change amount so that the tipping moment of the mobile crane is maintained within the predetermined amount after the configuration has changed.

11. The method according to claim 10 wherein the change amount is varied in dependence on a difference between the determined tipping moment and the predetermined amount.

12. The method according to claim 1 further comprising predicting characteristics of terrain which the mobile crane may traverse, wherein the user input comprises acceleration or deceleration and wherein altering a response to the user input comprises reducing, increasing or preventing the acceleration or deceleration.

13. A user display system for a mobile crane, the user display system comprising a user display and a configuration determinator, the user display comprising at least one display element, the display element corresponding to one or more mobile crane characteristics affected by user inputs, each display element comprising a first portion designating a safe zone of the corresponding one or more mobile crane characteristics and a second portion designating a warning zone of the corresponding one or more mobile crane characteristics, wherein the configuration determinator is operable to determine a current tipping moment of the mobile crane, the current tipping moment comprising a moment about a tipping line of the mobile crane;

predict an effect of the user input on the current tipping moment of the mobile crane; and automatically alter a response of the mobile crane to the user input when if the predicted effect of the user input is to increase the current tipping moment of the mobile crane past a predetermined amount;

designate a first range of the effect of the user input as a safe range and a second range of the effect of the user input as a warning range; and cause the user display to display the first portion and the second portion in dependence on a relation between the first range of the effect relative and the second range of the effect.

14. The system according to claim 13 wherein the configuration determinator is operable to update the user display in response to a change in a configuration of the mobile crane.

15. The system according to claim 13 wherein the configuration determinator is operable to evaluate the predetermined amount with respect to one or more of: one or more tipping lines of the mobile crane; a distance between a centre of gravity of the mobile crane and the one or more tipping lines; and a load being carried by the mobile crane.

16. The system according to claim 13 wherein the mobile crane characteristic corresponds to one or more of the following:
   a speed of the mobile crane;
   a luff angle of a boom of the mobile crane;
   an extension of the boom;
   an articulation of a front chassis of the mobile crane relative to a back chassis of the mobile crane;
   an activation of a winch of the mobile crane; and
   a lateral articulation angle of the boom of the mobile crane.

17. The system according to claim 16 wherein the at least one display element of the user display comprises a plurality of display elements, each display element corresponding to a different mobile crane characteristic.

18. The system according to claim 13 wherein the at least one display element comprises a rectangle and wherein the first and second portions are corresponding first and second portions of the rectangle.

19. The system according to claim 18 wherein a relative size of the first portion of the rectangle to the second portion of the rectangle is related to a size of the first range compared to a size of the second range.

20. The system according to claim 13 wherein the one or more mobile crane characteristics correspond to one or more of the following:
   a pitch of a chassis of the mobile crane; and
   a roll of a chassis of the mobile crane.

* * * * *

UNITED STATES PATENT AND TRADEMARK OFFICE
CERTIFICATE OF CORRECTION

PATENT NO. : 12,221,327 B2  
APPLICATION NO. : 17/769566  
DATED : February 11, 2025  
INVENTOR(S) : Michael Atherden Page 1 of 1

It is certified that error appears in the above-identified patent and that said Letters Patent is hereby corrected as shown below:

In the Claims

Column 13, Line 10, Claim 1:  
After "designating a first range of the"  
Delete "eff ct" and  
Insert -- effect --;

Column 13, Lines 10-11, Claim 1:  
After "of the user input as a safe"  
Delete "ad" and  
Insert -- range and --;

Column 13, Lines 15-16, Claim 1:  
After "characteristics affected by user"  
Delete "inputs." and  
Insert -- inputs, --.

Signed and Sealed this  
Twenty-first Day of October, 2025

John A. Squires  
*Director of the United States Patent and Trademark Office*